United States Patent
Shimono (10) Patent No.: US 8,753,181 B2
(45) Date of Patent: Jun. 17, 2014

(54) GAME SYSTEM, PROGRAM, AND INFORMATION STORAGE MEDIUM

(75) Inventor: Masataka Shimono, Yokohama (JP)

(73) Assignee: Namco Bandai Games Inc., Tokyo (JP)

(*) Notice: Subject to any disclaimer, the term of this patent is extended or adjusted under 35 U.S.C. 154(b) by 1404 days.

(21) Appl. No.: 12/071,668

(22) Filed: Feb. 25, 2008

(65) Prior Publication Data
US 2009/0036193 A1 Feb. 5, 2009

(30) Foreign Application Priority Data
Feb. 28, 2007 (JP) ................................. 2007-049320

(51) Int. Cl.
*A63F 13/00* (2014.01)

(52) U.S. Cl.
USPC .................................................... 463/1

(58) Field of Classification Search
USPC .................................................... 463/1
See application file for complete search history.

(56) References Cited

U.S. PATENT DOCUMENTS 6,267,677 B1 * 7/2001 Tajiri et al. ....................... 463/43

FOREIGN PATENT DOCUMENTS

JP   A-2004-248816   9/2004

* cited by examiner

*Primary Examiner* — Melba Bumgarner
*Assistant Examiner* — Thomas H Henry
(74) *Attorney, Agent, or Firm* — Oliff PLC (57) ABSTRACT

A program for a game device having a timer, the program causing a computer to function as: an event table storage section which stores an event table created based on registration information input by a player, the event table defining a plurality of first parameters used for an event process and an available period of each of the first parameters; an event condition setting section which determines whether or not the player has performed a predetermined operation, detects an operation timing of the predetermined operation when the predetermined operation has been determined to have been performed, sets a second parameter used for the event process based on the detected operation timing, and sets an event condition based on the second parameter; and an event processing section which determines whether or not the event condition has been satisfied, selects an available first parameter from the first parameters referring to the event table based on time information generated by the timer when the event condition has been determined to have been satisfied, and performs calculations based on the selected first parameter.

7 Claims, 8 Drawing Sheets

200 EVENT TABLE

| 220 | 210 |
|---|---|
| JANUARY 1 | GOOD LUCK |
| JANUARY 2 | WORST LUCK |
| JANUARY 3 | EXCELLENT LUCK |
| JANUARY 4 | AVERAGE LUCK |
| JANUARY 5 | BAD LUCK |
| JANUARY 6 | EXCELLENT LUCK |
| JANUARY 7 | GOOD LUCK |
| : | : |
| DECEMBER 31 | BAD LUCK |

200 EVENT TABLE

| 220 | 210 |
|---|---|
| JANUARY 1 | GOOD LUCK |
| JANUARY 2 | WORST LUCK |
| JANUARY 3 | EXCELLENT LUCK |
| JANUARY 4 | AVERAGE LUCK |
| JANUARY 5 | BAD LUCK |
| JANUARY 6 | EXCELLENT LUCK |
| JANUARY 7 | GOOD LUCK |
| : | : |
| DECEMBER 31 | BAD LUCK |

GAME SYSTEM, PROGRAM, AND INFORMATION STORAGE MEDIUM

Japanese Patent Application No. 2007-49320, filed on Feb. 28, 2007, is hereby incorporated by reference in its entirety.

BACKGROUND OF THE INVENTION

The present invention relates to a game system, a program, and an information storage medium.

A game system has been known which causes an event to occur in a game device corresponding to time.

In such a game system, one event table may be selected from a plurality of event tables provided in advance based on the player's name set corresponding to each game device, and an event may be generated during the game based on the selected event table (see JP-A-2004-248816, for example).

However, since the above game system generates an event merely referring to the event table provided in advance, situations of events are restricted, whereby the player may lose interest.

SUMMARY

According to a first aspect of the invention, there is provided a program for a game device having a timer, the program causing a computer to function as:

an event table storage section which stores an event table created based on registration information input by a player, the event table defining a plurality of first parameters used for an event process and an available period of each of the first parameters;

an event condition setting section which determines whether or not the player has performed a predetermined operation, detects an operation timing of the predetermined operation when the predetermined operation has been determined to have been performed, sets a second parameter used for the event process based on the detected operation timing, and sets an event condition based on the second parameter; and an event processing section which determines whether or not the event condition has been satisfied, selects an available first parameter from the first parameters referring to the event table based on time information generated by the timer when the event condition has been determined to have been satisfied, and performs calculations based on the selected first parameter.

According to a second aspect of the invention, there is provided a program which creates the above-described event table, the program causing a computer to function as an event table creation section which creates the event table based on registration information input by a player.

According to a third aspect of the invention, there is provided a computer-readable information storage medium storing any of the above-described programs.

According to a fourth aspect of the invention, there is provided a game system including a game device having a timer, the game system comprising:

an event table creation section which creates an event table based on registration information input by a player, the event table defining a plurality of first parameters used for an event process and an available period of each of the first parameters;

an event table storage section which stores the created event table;

an event condition setting section which determines whether or not the player has performed a predetermined operation, detects an operation timing of the predetermined operation when the predetermined operation has been determined to have been performed by the player, sets a second parameter used for the event process based on the detected operation timing, and sets an event condition based on the second parameter; and an event processing section which determines whether or not the event condition has been satisfied, selects an available first parameter from the first parameters referring to the event table based on time information generated by the timer when the event condition has been determined to have been satisfied, and performs calculations based on the selected first parameter.

DETAILED DESCRIPTION OF THE EMBODIMENT

The invention may provide a game system, a program, and an information storage medium which prevent situations of events to be occurred in a game from being restricted to interest players.

(1) According to one embodiment of the invention, there is provided a program for a game device having a timer, the program causing a computer to function as:

an event table storage section which stores an event table created based on registration information input by a player, the event table defining a plurality of first parameters used for an event process and an available period of each of the first parameters;

an event condition setting section which determines whether or not the player has performed a predetermined operation, detects an operation timing of the predetermined operation when the predetermined operation has been determined to have been performed, sets a second parameter used for the event process based on the detected operation timing, and sets an event condition based on the second parameter; and an event processing section which determines whether or not the event condition has been satisfied, selects an available first parameter from the first parameters referring to the event table based on time information generated by the timer when the event condition has been determined to have been satisfied, and performs calculations based on the selected first parameter.

According to one embodiment of the invention, there is provided a computer-readable information storage medium storing any of the above-described programs.

According to one embodiment of the invention, there is provided a game system including a game device having a timer, the game system comprising:

an event table creation section which creates an event table based on registration information input by a player, the event table defining a plurality of first parameters used for an event process and an available period of each of the first parameters;

an event table storage section which stores the created event table;

an event condition setting section which determines whether or not the player has performed a predetermined operation, detects an operation timing of the predetermined operation when the predetermined operation has been determined to have been performed by the player, sets a second parameter used for the event process based on the detected operation timing, and sets an event condition based on the second parameter; and an event processing section which determines whether or not the event condition has been satisfied, selects an available first parameter from the first parameters referring to the event table based on time information generated by the timer when the event condition has been determined to have been satisfied, and performs calculations based on the selected first parameter.

In the above embodiments, the event table created based on the registration information input by the player may be an event table selected from a plurality of event tables provided in advance based on the registration information input by the player.

In the above embodiments, the term "available period of the first parameter" refers to information which specifies the available period of the first parameter in the event process. The term "available period of the first parameter" may be information which specifies an available day or the like, or may be information which specifies both of an available period and an unavailable period.

In the above embodiments, the operation timing of the predetermined operation may be detected by acquiring the time when the predetermined operation has been performed based on the time information generated by the timer.

In the above embodiments, setting the second parameter includes the case where the second parameter is set only when the predetermined operation has been performed and the case where the default value of the second parameter is set in advance and is changed when the predetermined operation has been performed.

In the above embodiments, whether or not the event condition has been satisfied may be determined by whether or not the result of game calculations performed based on the operation input by the player satisfies the event condition.

According to the above embodiments, a different event process (calculations based on the first parameter) can be performed depending on the player by performing calculations based on the first parameter referring to the event table created based on the registration information input by the player when it has been determined that the event condition has been satisfied. Moreover, the event condition for performing calculations based on the first parameter can be changed based on the operation of the player by setting the second parameter based on the operation timing of the predetermined operation performed by the player and setting the event condition based on the second parameter, whereby preventing situations of events from being restricted.

(2) In each of the program and the information storage medium, the event condition setting section may set a default value of the second parameter in association with the available period of the first parameter defined in the event table based on the time information generated by the timer, detect the operation timing of the predetermined operation when the predetermined operation has been determined to have been performed, and change the default value of the second parameter based on the detected operation timing.

In the above embodiments, the statement "the default value of the second parameter is set in association with the available period of the first parameter" includes the case where the default value is set at the timing at which a currently available first parameter is made unavailable and the case where the default value is set at the timing at which a currently unavailable first parameter is made available.

In the above embodiments, the event condition is set based on the default value of the second parameter until the player performs the predetermined operation. The default value of the second parameter is changed based on the operation timing when it has been determined that the player has performed the predetermined operation, and the event condition is set based on the changed second parameter.

(3) Each of the program and the information storage medium may further cause the computer to function as:

an event notification section which determines whether or not the player has performed the predetermined operation, and notifies the player of the event condition when the predetermined operation has been determined to have been performed.

In the above embodiments, the statement "notifies the player of the event condition" includes the case where the event condition is displayed as a character or an image and the case where the event condition is output as sound.

According to the above embodiments, it is possible to motivate the player to play the game by notifying the player of the event condition set by the event condition setting section.

(4) In each of the program and the information storage medium, the event condition setting section may determine whether or not the event condition has been satisfied when the predetermined operation has been determined to have been performed, detect the operation timing of the predetermined operation only when the event condition has been determined not to have been satisfied, and change the default value of the second parameter based on the detected operation timing.

According to the above embodiments, since the default value of the second parameter is not changed when it has been determined that the set event condition has been satisfied, a situation in which the player is notified of an event condition differing from an event condition which has been satisfied.

(5) In each of the program and the information storage medium, the event processing section may calculate an action of a player character in a game space based on an operation input by the player, determine whether or not the action of the player character satisfies the event condition, select an available first parameter from the first parameters referring to the event table based on the time information generated by the timer when the event condition has been determined to have been satisfied by the action of the player character, and perform calculations based on the selected first parameter.

(6) According to one embodiment of the invention, there is provided a program which creates the above-described event table, the program causing a computer to function as an event table creation section which creates the event table based on registration information input by a player.

In the above embodiment, the event table may be created based on the registration information input by the player by selecting one event table from a plurality of event tables provided in advance based on the registration information input by the player.

According to the above embodiment, a different event process (calculations based on the first parameter) can be performed depending on the player by creating the event table based on the registration information input by the player.

The embodiments of the invention will be described below. Note that the embodiments described below do not in any way limit the scope of the invention laid out in the claims herein. In addition, not all of the elements of the embodiments described below should be taken as essential requirements of the invention.

1. Configuration

Figure 1:
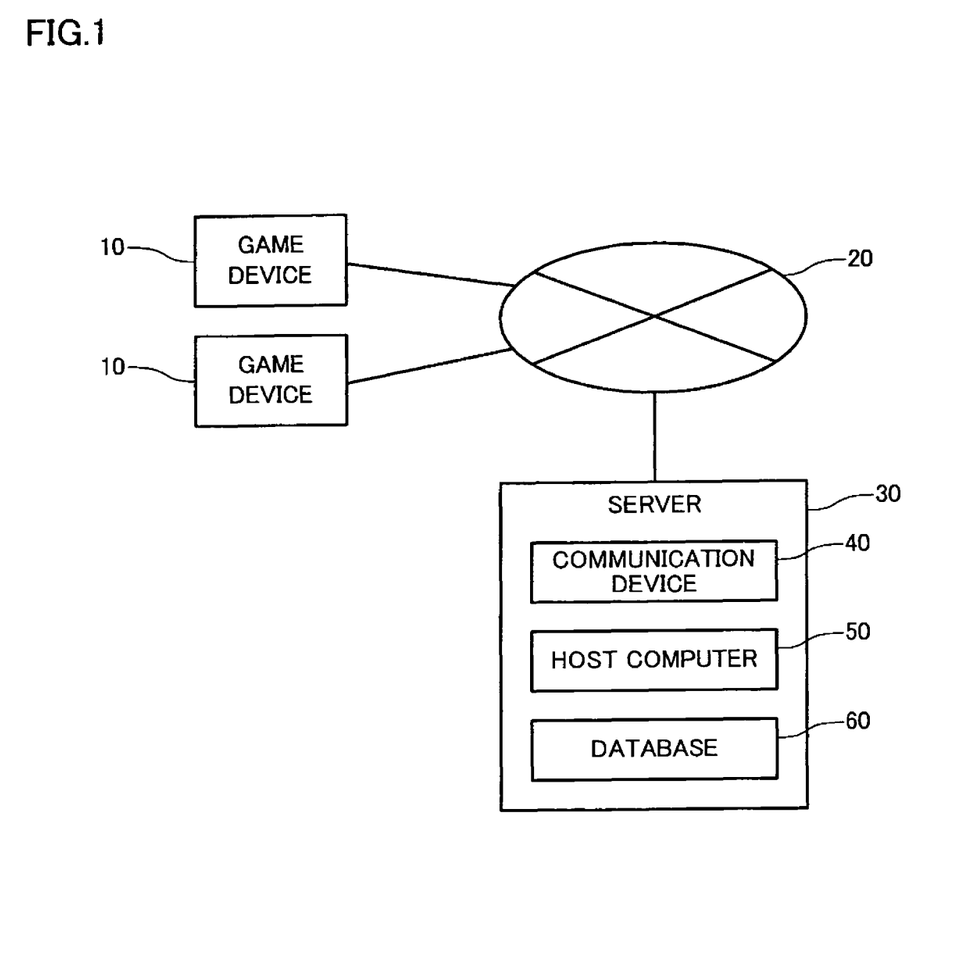
FIG. 1 is a diagram showing the configuration of a game system according to one embodiment of the invention.

FIG. 1 shows an example of a game system according to one embodiment of the invention.

The game system according to this embodiment includes a game device 10 and a server 30. The game device 10 and the server 30 are connected through a network 20 such as the Internet. The game device 10 may be a portable game device or a portable telephone which can execute a program. The network 20 may be the Internet, a dedicated line, or a mobile communication network, or may be a cable or wireless LAN channel.

The server 30 includes a communication device 40 which is connected to the network 20 and transmits/receives data, a host computer 50 such as a work station, and a database 60.

The communication device 40 includes a modem, a terminal adapter a router, or the like. The communication device 40 transmits/receives data to/from the game device 10 or another server device through the network 20.

Figure 2:
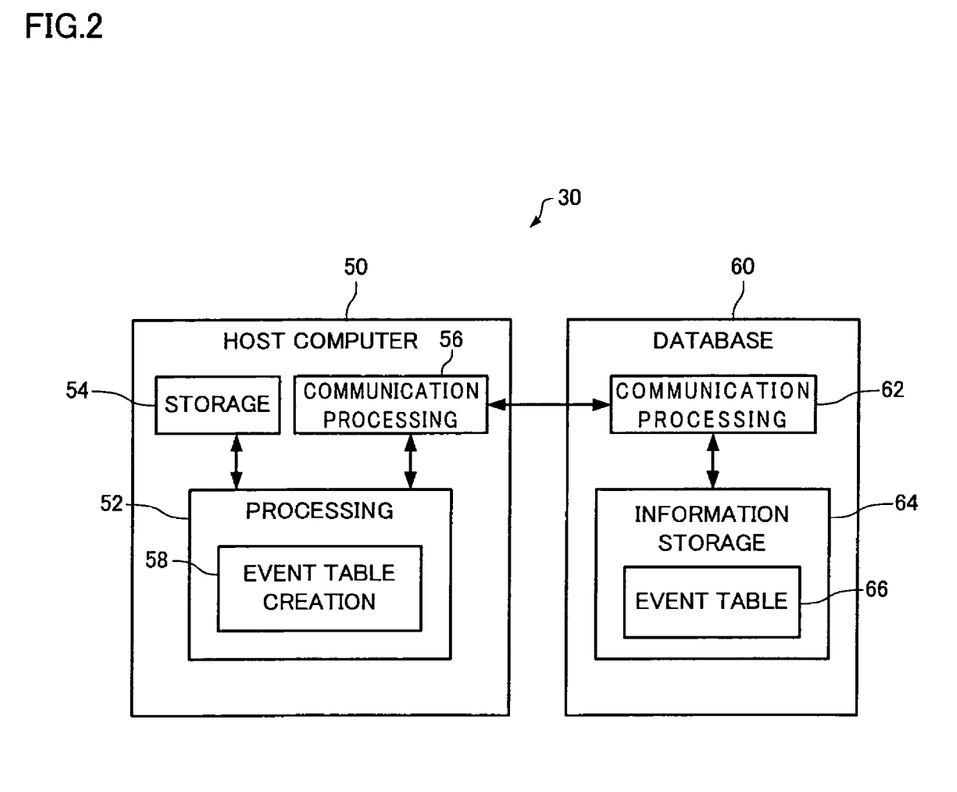
FIG. 2 is a functional block diagram showing a server of a game system according to one embodiment of the invention.

FIG. 2 shows an example of a functional block diagram of the server 30 of the game system according to this embodiment.

The server 30 includes a host computer 50 and a database 60.

The host controller 50 includes a processing section 52, a storage section 54, and a communication processing section 56.

The communication processing section 56 exchanges data with the game device 10 and the database 60, and has a transmission function and a reception function. Note that a transmission means and a reception means may be separately provided to implement a transmission/reception function.

The processing section 52 performs various processes based on a received processing request. The function of the processing section 52 may be implemented by hardware such as a processor (e.g. CPU or DSP) or ASIC (e.g. gate array) and a given program.

The processing section 52 includes an event table creation section 58. The event table creation section 58 receives registration information input by the player using the game device 10, and creates an event table which defines a plurality of first parameters used for an event process and the available period of each first parameter based on the received registration information.

The event table may be created by selecting one event table from a plurality of event tables provided in advance based on the registration information or information obtained by encoding the registration information.

The processing section 52 transmits the entirety or part of the created event table to the game device 10 in response to a transmission request from the game device 10 or at a predetermined timing.

The database 60 includes a communication processing section 62 which transmits/receives data to/from the host computer 50, and an information storage section 64 which stores an created event table 66 in an available state. The database 60 functions as an event table database.

The information storage section 64 is a CPU-readable storage medium such as a magnetic storage medium, an optical storage medium, or a semiconductor memory. The information storage section 64 is implemented by a RAM, a hard disk (magnetic disk), a flexible disk, a CD-ROM, or the like.

The event database stores the event table created by the event table creation section 58 while associating the event table with the player who has input the registration information.

Figure 3:
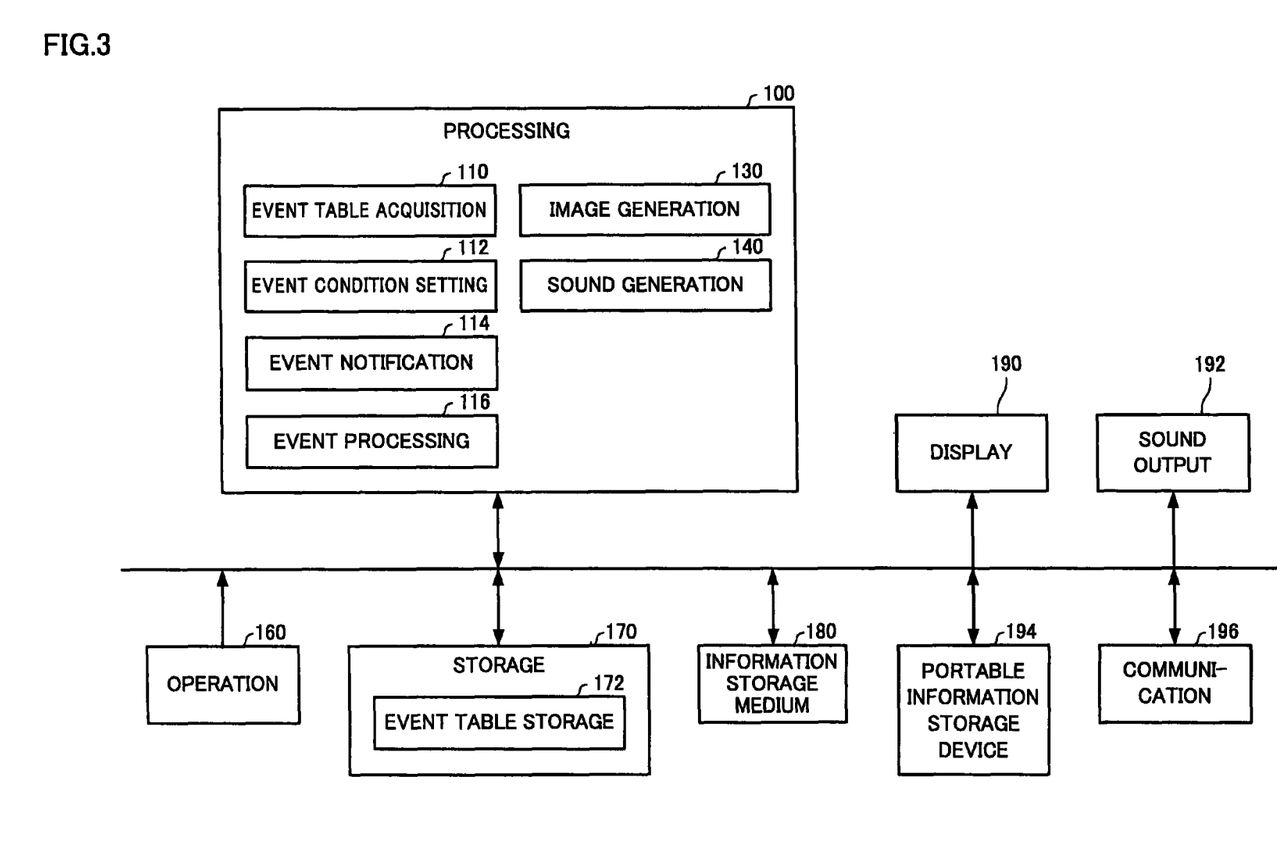
FIG. 3 is a functional block diagram showing a game device of a game system according to one embodiment of the invention.

FIG. 3 shows an example of a functional block diagram of the game device 10 of the game system according to this embodiment. In FIG. 3, it suffices that the game device 10 according to this embodiment include at least a processing section 100 (or processing section 100 and storage section 170). The remaining blocks (functional blocks) may be provided arbitrarily.

An operation section 160 allows the player to input operation data. The function of the operation section 160 may be implemented by hardware such as a lever, a button, a steering wheel, a shift lever, an accelerator pedal, a brake pedal, a microphone, a sensor, or a casing.

A storage section 170 serves as a work area for the processing section 100, a communication section 196, and the like. The function of the storage section 170 may be implemented by hardware such as a RAM.

The storage section 170 includes an event table storage section 172. The event table storage section 172 stores the event table acquired from the server 30.

An information storage medium 180 (computer-readable medium) stores a program, data, and the like. The function of the information storage medium 180 may be implemented by hardware such as an optical disk (CD, DVD, or Blu-ray Disc), a magneto-optical disk (MO), a magnetic disk, a hard disk, a magnetic tape, or a memory (ROM). The processing section 100 performs various processes according to this embodiment based on a program (data) stored in the information storage medium 180. Specifically, a program which causes a computer to function as each section (each means) according to this embodiment (program which causes a computer to implement each section) is stored (recorded) in the information storage medium 180.

A display section 190 outputs an image generated according to this embodiment. The function of the display section 190 may be implemented by hardware such as a CRT, an LCD, or a head mount display (HMD).

A sound output section 192 outputs sound generated according to this embodiment. The function of the sound output section 192 may be implemented by hardware such as a speaker or a headphone.

A portable information storage device 194 stores a player's personal data, game save data, and the like. As the portable information storage device 194, a memory card or the like may be used.

The communication section 196 performs various types of control for communicating with the server 30. The function of the communication section 196 may be implemented by hardware such as a processor or a communication ASIC, a program, and the like.

A program (data) which causes a computer to function as each section according to this embodiment may be distributed to the information storage medium 180 (storage section 170) from an information storage medium included in the server 30 through the network 20 and the communication section 196. Use of the information storage medium of the server 30 is also included within the scope of the invention.

The processing section 100 (processor) performs various processes such as a game process, an image generation process, or a sound generation process based on operation data from the operation section 160, a program, and the like. In this case, the processing section 100 performs various processes using the storage section 170 as a work area. The function of the processing section 100 may be implemented by hardware such as a processor (e.g., main processor, drawing processor, or DSP) or an ASIC (e.g., gate array) and a program (game program).

The processing section 100 includes an event table acquisition section 110, an event condition setting section 112, an event notification section 114, an event processing section 116, an image generation section 130, and a sound generation section 140.

The event table acquisition section 110 acquires the event table from the server 30, and writes the acquired event table into the event table storage section 172. Specifically, the event table acquisition section 110 acquires the event table by sending an event table transmission request to the server 30 through the communication section 196. The event table acquisition section 110 may send the event table transmission request each time the game device 10 is activated, or may send the event table transmission request at predetermined intervals based on time information generated by a timer included in the game device 10.

The event condition setting section 112 determines whether or not the player has performed a predetermined operation based on the operation data from the operation section 160. When the event condition setting section 112 has determined that the player has performed the predetermined operation, the event condition setting section 112 detects the operation timing of the predetermined operation, sets a second parameter used for the event process based on the detected operation timing, and sets an event condition based on the second parameter.

The event condition setting section 112 may set a default value of the second parameter in association with the available period of the first parameter defined in the event table stored in the event table storage section 172 based on the time information generated by the timer. When the event condition setting section 112 has determined that the player has performed the predetermined operation, the event condition setting section 112 may detect the operation timing of the predetermined operation, and change the default value of the second parameter based on the detected operation timing.

When the event condition setting section 112 has determined that the player has performed the predetermined operation, the event condition setting section 112 may determine whether or not the event condition has been satisfied. The event condition setting section 112 may detect the operation timing of the predetermined operation only when the event condition setting section 112 has determined that the event condition has not been satisfied, and change the default value of the second parameter based on the detected operation timing.

The event notification section 114 determines whether or not the player has performed the predetermined operation. When the event notification section 114 has determined that the player has performed the predetermined operation, the event notification section 114 notifies the player of the event condition set by the event condition setting section 112.

The event processing section 116 determines whether or not the event condition set by the event condition setting section 112 has been satisfied. When the event processing section 116 has determined that the event condition set by the event condition setting section 112 has been satisfied, the event processing section 116 selects an available first parameter based on the time information generated by the timer referring to the event table stored in the event table storage section 172, and performs calculations based on the selected first parameter.

The event processing section 116 may calculate the movement (action) of a player character in a game space based on the operation data from the operation section 160. The event processing section 116 may determine whether or not the calculated movement of the player character satisfies the event condition set by the event condition setting section 112. When the event processing section 116 has determined that the calculated movement of the player character satisfies the event condition set by the event condition setting section 112, the event processing section 116 may select an available first parameter based on the time information generated by the timer referring to the event table stored in the event table storage section 172, and perform calculations based on the selected first parameter.

The image generation section 130 performs a drawing process based on the results of various processes (game process) performed by the processing section 100, and outputs the generated image to the display section 190. In this case, the image generated by the image generation section 130 may be a two-dimensional image or a three-dimensional image.

The sound generation section 140 processes sound based on the results of various processes performed by the processing section 100, generates game sound such as background music (BGM), effect sound, or voice, and outputs the generated game sound to the sound output section 192.

2. Method

A method according to this embodiment is described below with reference to the drawings.

Figure 4:
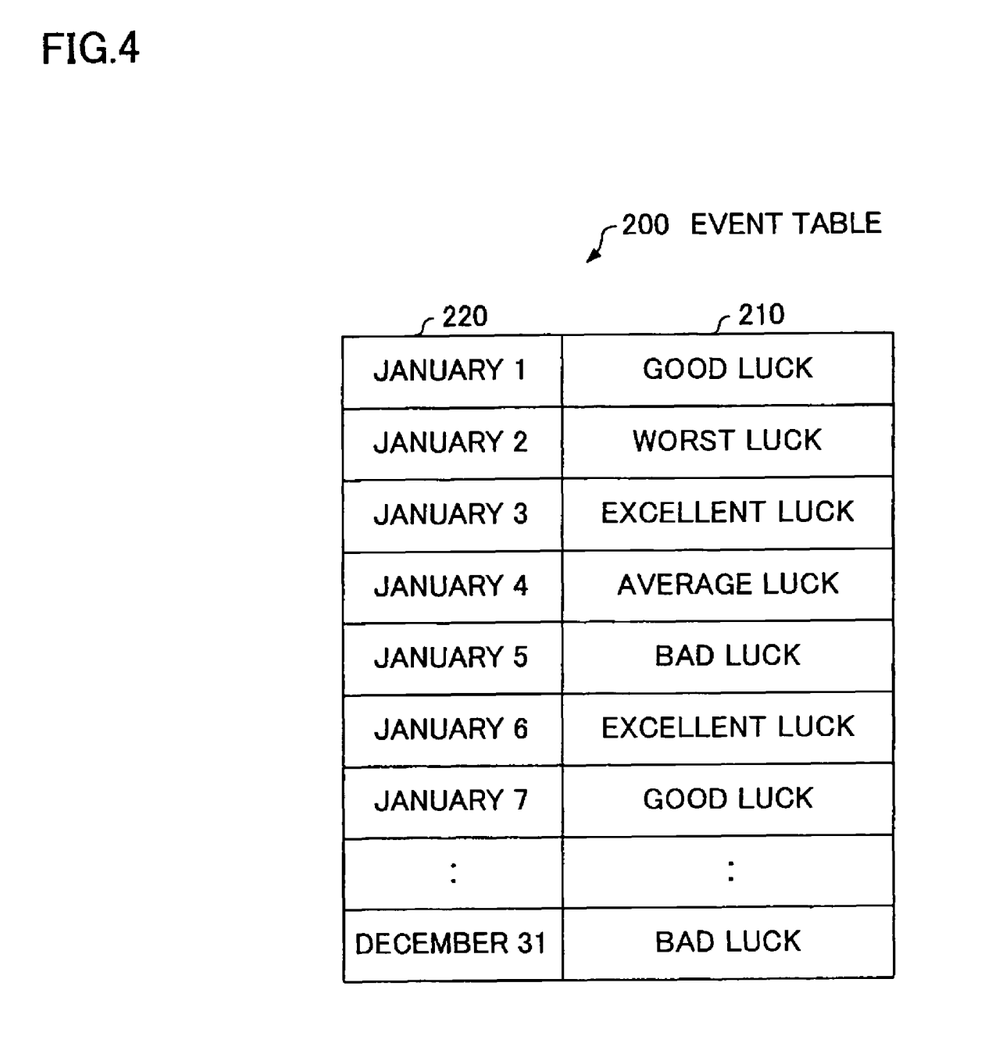
FIG. 4 is a table for describing a method according to one embodiment of the invention.

FIG. 4 shows an example of the event table created according to this embodiment.

An event table 200 defines a plurality of first parameters 210 and an available period 220 of each first parameter. In this example, a fortune on each day (one year) is defined as the first parameter 220.

The event table creation section 58 selects one event table from a plurality of event tables which are provided in advance and differ in the arrangement of the first parameters 210 based on information obtained by encoding registration information (e.g., birth date, sex, and blood type) input by the player, and stores the selected event table in the database 60 while associating the event table with the player.

The event table acquisition section 110 acquires a monthly event table from the server 30 once a month, and updates the stored event table by the acquired event table. For example, when acquiring a January event table, the event table acquisition section 110 acquires an event table of which the available period 220 is in the range of January 1 to January 31 from the annual event table stored in the database 60. The event table acquisition section 110 may acquire the annual event table at a time.

FIGS. 5, 6A, 6B, 7A, and 7B show examples of a game image generated according to this embodiment.

The player operates the player character in the game space to take various actions. A time elapses in the game space in the same manner as in the actual world, and fortune-telling occurs once a day.

Figure 5:
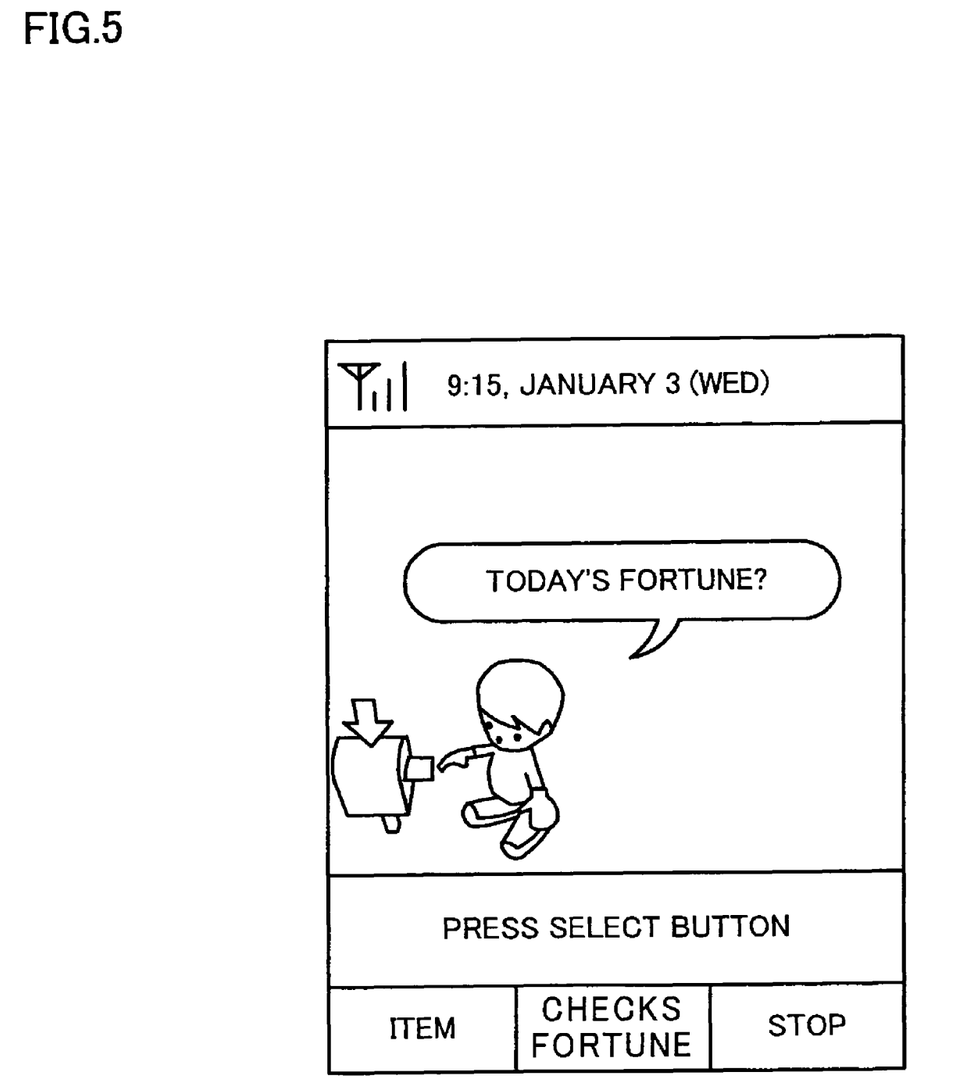
FIG. 5 is a diagram illustrative of a method according to one embodiment of the invention.
Figure 6A:
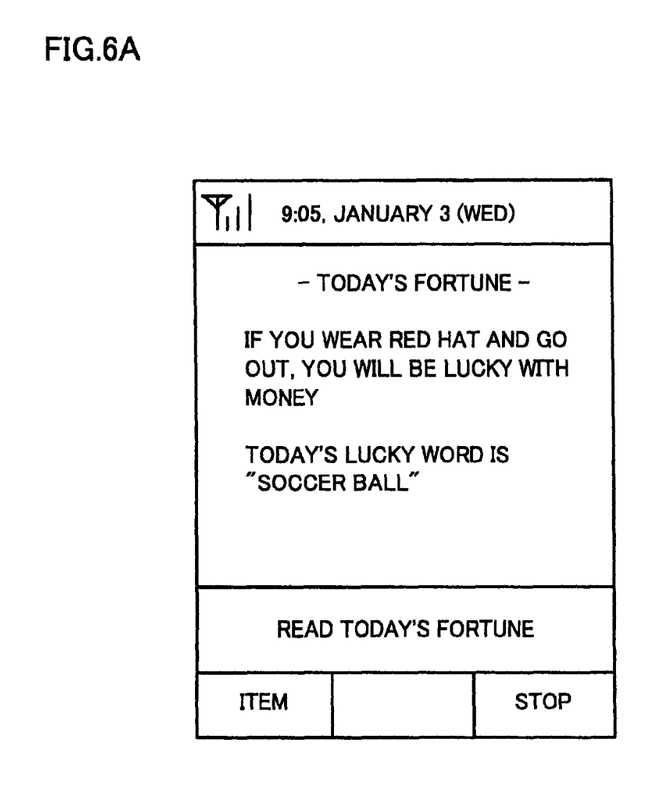
FIGS. 6A and 6B are diagrams illustrative of a method according to one embodiment of the invention.
Figure 6B:
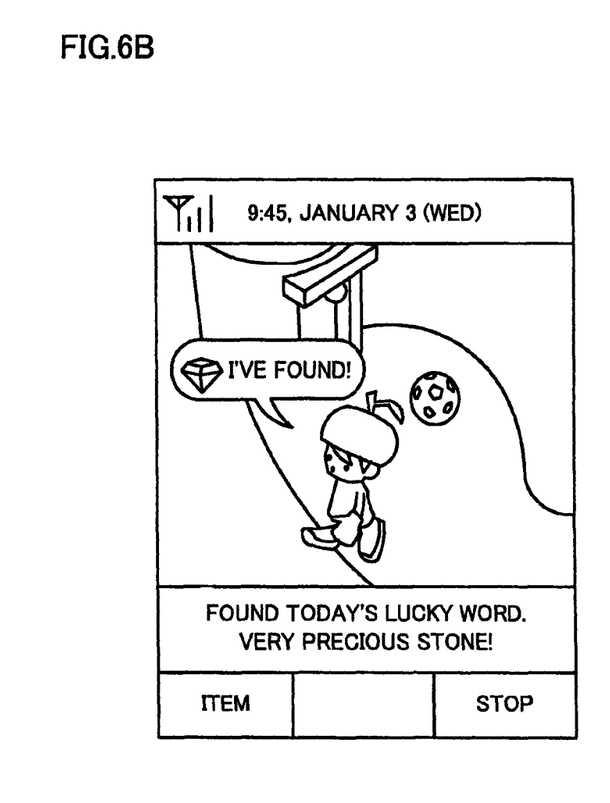

When the player presses a select button of a portable telephone (game device) when a screen shown in FIG. 5 is displayed, a fortune on that day is displayed, as shown in FIG. 6A. Some advice for the player character is displayed on the screen. As shown in FIG. 6B, when the player character wears a red hat and visits a place where a soccer ball is placed following the advice, the player character can acquire an item "precious stone". In this case, the player causes a list of items owned by the player character (player) to be displayed, and selects "red hat" from the list of the items so that the player character wears a red hat.

The event condition setting section 112 sets the default value of the second parameter randomly or according to a predetermined rule in association with the available period of the first parameter. In this embodiment, the available period of the first parameter is set daily, as shown in FIG. 4. Therefore, the event condition setting section 112 sets the default value of the second parameter to be "blue, hat, and elderly person" when the date changes. The event condition setting section 112 sets an event condition "wears a blue hat and meets an elderly person" based on the default value of the second parameter. When the event condition setting section 112 has determined that the player has pressed the select button (predetermined operation) when the fortune is displayed, the event condition setting section 112 detects the time "9:05" (operation timing) when the player has pressed the select button (has performed the predetermined operation) based on the time information generated by the timer, and changes the default value of the second parameter to a value which indicates "red, hat, and soccer ball" based on the detected time. The event condition setting section 112 sets a new event condition "wears a red hat and finds a soccer ball" based on the second parameter which has been changed.

The event notification section 114 displays the advice (fortune) shown in FIG. 6A based on the event condition "wears a red hat and finds a soccer ball".

When the event processing section 116 has determined that the action of the player character satisfies the event condition "wears a red hat and finds a soccer ball", the event processing section 116 selects the first parameter "excellent luck" of which the available period is "January 3" based on the time information generated by the timer referring to the event table stored in the event table storage section 172. The event processing section 116 then performs game calculations which cause the player character to pick up a precious stone based on the selected first parameter "excellent luck". An item acquired by game calculations is determined based on the first parameter. Specifically, an item group which can be acquired is defined in a table corresponding to the first parameters "excellent luck", "average luck", "good luck", "bad luck", and "worst luck", and an item acquired by game calculations is determined from the item group which can be acquired based on the selected first parameter referring to the table. For example, when the available first parameter is "good luck", the event processing section 116 performs calculations which cause the player character to acquire an item of less value than the precious stone for the player. Calculations based on the first parameter are not limited to calculations which cause the player character to acquire an item. For example, game calculations such as causing the player character to encounter another character or changing the weather may be performed.

When the player has performed the predetermined operation, the event condition "wears a blue hat and meets an elderly person" set based on the default value of the second parameter has been satisfied, the event condition setting section 112 does not change the default value of the second parameter based on the operation timing, and the event notification section 114 displays some fortune-telling advice based on the event condition set corresponding to the default value. This prevents a situation in which the player is notified of the event condition "wears a red hat and finds a soccer ball" instead of the event condition "wears a blue hat and meets an elderly person" which has been satisfied.

Figure 7A:
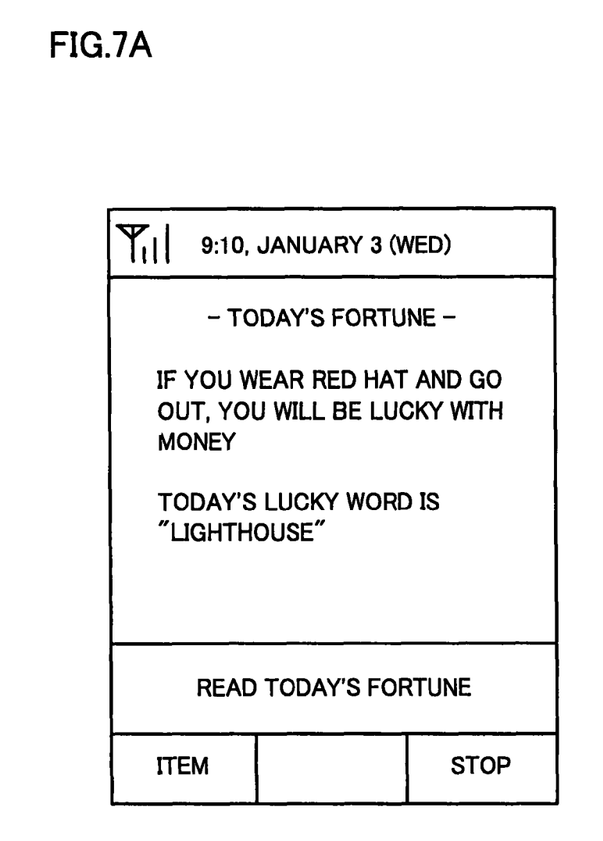
FIGS. 7A and 7B are diagrams illustrative of a method according to one embodiment of the invention.
Figure 7B:
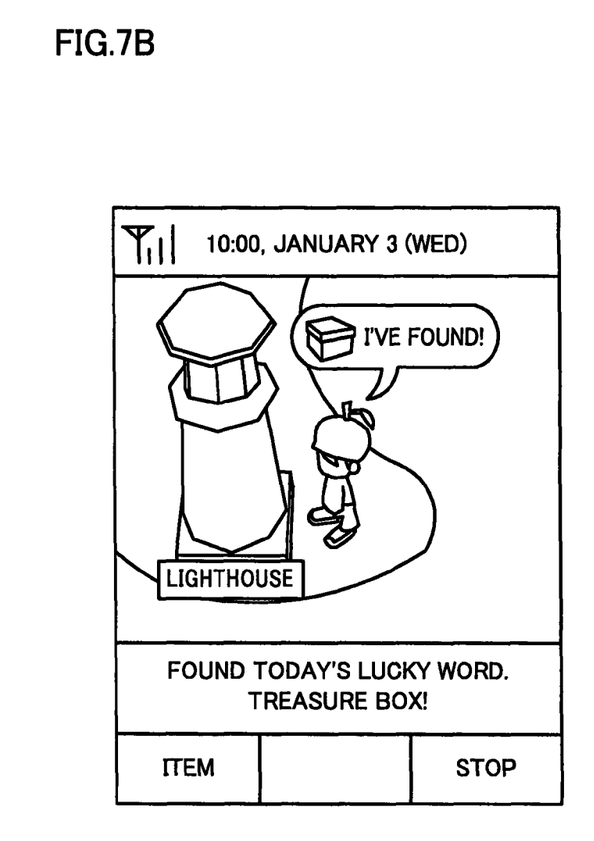

In FIG. 7A, since the player has performed the predetermined operation (i.e., pressing the select button" at a time differing from the time shown in FIG. 6A, advice differing from the advice shown in FIG. 6A is displayed. As shown in FIG. 7B, when the player character wears a red hat and visits a lighthouse following the advice, the player character can acquire an item.

The event condition setting section 112 detects the time "9:10" (operation timing) when the player has performed the predetermined operation, and changes the default value of the second parameter to a value which indicates "red, hat, and lighthouse" based on the detected time "9:10". The event condition setting section 112 sets a new event condition "wears a red hat and visits a lighthouse" based on the second parameter which has been changed.

The event notification section 114 displays the advice (fortune) shown in FIG. 7A based on the event condition "wears a red hat and visits a lighthouse".

When the event processing section 116 has determined that the action of the player character satisfies the event condition "wears a red hat and visits a lighthouse", the event processing section 116 selects the first parameter "excellent luck" of which the available period is "January 3" based on the time information generated by the timer referring to the event table stored in the event table storage section 172. The event processing section 116 then performs item acquisition calculations based on the selected first parameter "excellent luck".

As described above, the event condition can be changed depending on the operation timing of the predetermined operation performed by the player so that the event can be changed.

3. Process

Figure 8:
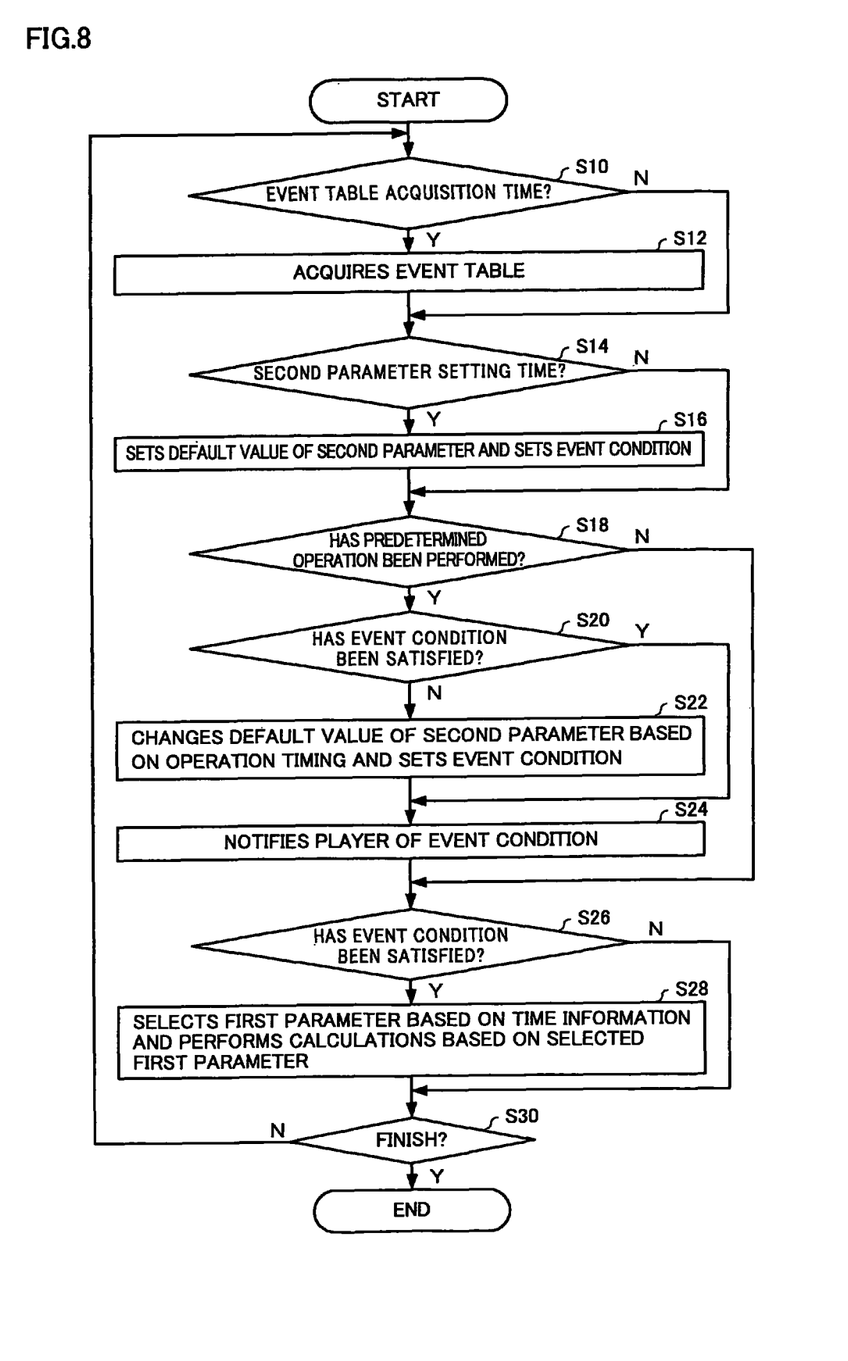
FIG. 8 is a flowchart showing a process example of a game device according to one embodiment of the invention.

An example of the process of the game device according to this embodiment is described below using a flowchart shown in FIG. 8.

The game device determines whether or not to acquire the event table stored in the database 60 (i.e., whether or not the event table acquisition time has been reached) based on the time information generated by the timer (step S10). When the game device has determined that the event table acquisition time has been reached, the game device acquires the event table from the server 30, and updates the event table stored in the event table storage section 172 (step S12).

The game device determines whether or not to set the default value of the second parameter (i.e., whether or not the second parameter setting time has been reached) based on the time information generated by the timer (step S14). When the game device has determined that the second parameter setting time has been reached, the game device sets the default value of the second parameter, and sets the event condition based on the default value of the set second parameter (step S16). The default value of the second parameter is set in association with the available period of the first parameter.

The game device determines whether or not the player has performed the predetermined operation (step S18). When the game device has determined that the player has performed the predetermined operation, the game device determines whether or not the set event condition has been satisfied (step S20). When the game device has determined that the set event condition has not been satisfied, the game device detects the operation timing of the predetermined operation, changes the default value of the second parameter based on the detected operation timing, and sets the event condition based on the second parameter which has been changed (step S22). When the game device has determined that the player has not performed the predetermined operation, the game device proceeds to a step S26. When the game device has determined that the set event condition has been satisfied, the game device proceeds to a step S24.

The game device then notifies the player of the set event condition (step S24).

The game device then determines whether or not the action of the player character satisfies the set event condition (step S26). When the game device has determined that the action of the player character satisfies the set event condition, the game device selects an available first parameter based on the time information generated by the timer referring to the event table stored in the event table storage section 172, and performs calculations based on the selected first parameter (step S28). The game device can determine whether or not the set event condition has been satisfied in the step S20 setting a flag which indicates that the event condition has been satisfied while associating the flag with the event condition. The flag may be reset when setting the event condition in the steps S16 and S22.

The game device then determines whether or not to continue the game process (step S30). When the game device continues the game process, the game device returns to the step S10, and repeats the process from the step S10.

The invention is not limited to the above-described embodiments, and various modifications can be made. For example, any term cited together with a different term having a broader meaning or the same meaning at least once in this specification or drawings can be replaced by the different term in any place in this specification and drawings.

The above embodiments have been described taking an example in which one event condition is set. Note that a plurality of second parameters and a plurality of event conditions may be set. In this case, whether or not the respective event conditions have been satisfied is determined. When the respective event conditions have been satisfied, calculations are performed based on respective available first parameters.

The invention may be applied to various game systems such as an arcade game system, a consumer game system, a portable game system, a large-scale attraction system in which a number of players participate, a simulator, a multimedia terminal, and a system board which generates a game image.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A non-transitory computer readable storage medium storing a program for a game device having a timer which maintains real-world time information, the program, when executed by a processor, causes a computer to function as:
    an event table storage section which stores a plurality of event tables that each include a plurality of first parameters used for an event process and an available period of time of each of the first parameters, where each of the event tables differ in an arrangement of the first parameters with respect to the available period of time, and an event table is selected from the plurality of event tables based on registration information input by a player, such that if the player inputs different registration information, a different event table from the plurality of event tables is selected;
    an event condition setting section which determines whether or not the player has performed a predetermined operation, detects current period of time based on the timer that corresponds to one of the available periods of time in which the predetermined operation has been determined to have been performed, sets a second parameter used for the event process based on the detected current period of time, and sets an event condition based on the current period of time relating to an action of a player character in a game space based on the second parameter; and
    an event processing section which calculates the action of the player character in the game space based on an operation input by the player, determines whether or not the action of the player character satisfies the event condition, selects an available first parameter from the first parameters referring to the event table based on the current period of time, when the event condition has been determined to have been satisfied by the action of the player character, and performs calculations which cause the player character to acquire an item determined based on the selected first parameter.

2. The non-transitory computer readable storage medium of claim 1,
    wherein the event condition setting section sets a default value of the second parameter in association with the available period of time of the first parameter defined in the event table based on the time information generated by the timer, detects the current period of time, and changes the default value of the second parameter based on the detected current period of time.

3. The non-transitory computer readable storage medium of claim 2, the program further causing the computer to function as:
    an event notification section which determines whether or not the player has performed the predetermined operation, and notifies the player of the event condition when the predetermined operation has been determined to have been performed.

4. The non-transitory computer readable storage medium of claim 3,
    wherein the event condition setting section determines whether or not the event condition has been satisfied when the predetermined operation has been determined to have been performed, detects the current period of time only when the event condition has been determined not to have been satisfied, and changes the default value of the second parameter based on the detected current period of time.

5. The non-transitory computer readable storage medium of claim 1, the program further causing the computer to function as:
    an event notification section which determines whether or not the player has performed the predetermined operation, and notifies the player of the event condition when the predetermined operation has been determined to have been performed.

6. The non-transitory computer readable storage medium of claim 1, the program further causing a computer to function as:
    an event table creation section which creates the event table based on registration information input by a player.

7. A game system including a game device having a timer which maintains real-world time information, the game system comprising:
    a memory storing instructions including:
        an event table creation section which creates an event table that (i) is based on registration information input by a player, and (ii) includes a plurality of first parameters used for an event process and an available period of time of each of the first parameters with respect to the available period of time, such that if a player inputs different registration information, it causes a different event table that varies in the arrangement of the first parameters to be created, an event table storage section which stores the created event table, an event condition setting section which determines whether or not the player has performed a predetermined operation, detects timing current period of time based on timer that corresponds to one of the available periods of time in which the predetermined operation has been determine to have been performed by the player, sets a second parameter used for the event process based on the detected current period of time, and sets an event condition based on the current period of time relating to an action of a player character in a game space based on the second parameter, and an event processing section which calculates the action of the player character in the game space based on an operation input by the player, determines whether or not the action of the player character satisfies the event condition, selects an available first parameter from the first parameters referring to the event table based on the current period of time, when the event condition has been determined to have been satisfied by the action of the player character, and performs calculations which cause the player character to acquire an item determined based on the selected first parameter; and a processor that executes the instructions stored on the memory.

* * * * *